United States Patent
Khan et al.

[11] Patent Number: 5,875,070
[45] Date of Patent: Feb. 23, 1999

[54] SUSPENSION FLEXURE WITH PRIMARY AND SECONDARY STIFFNESS CONTROL

[75] Inventors: Aman Khan; Daniel Vera; Koji Iwamoto, all of Temecula, Calif.

[73] Assignee: Magnecomp Corp., Temecula, Calif.

[21] Appl. No.: 726,080

[22] Filed: Oct. 4, 1996

Related U.S. Application Data

[60] Provisional application No. 60/026,747 Sep. 26, 1996.

[51] Int. Cl.⁶ ....................................................... G11B 5/48
[52] U.S. Cl. ............................................................. 360/104
[58] Field of Search ............................................. 360/104

[56] References Cited

U.S. PATENT DOCUMENTS

| | | | |
|---|---|---|---|
| 3,801,388 | 4/1974 | Akiyama et al. | 216/20 |
| 3,841,905 | 10/1974 | Dixon | 216/20 |
| 4,606,788 | 8/1986 | Moran | 216/13 |
| 4,884,154 | 11/1989 | Onodera et al. | 360/104 |
| 5,006,946 | 4/1991 | Matsuzaki | 360/104 |
| 5,039,570 | 8/1991 | Sturm | 216/20 |
| 5,491,597 | 2/1996 | Bennin et al. | 360/104 |

*Primary Examiner*—John H. Wolff
*Attorney, Agent, or Firm*—Louis J. Bachand

[57] ABSTRACT

Optimized stiffness in a disk drive suspension comprising a load beam and a flexure structure is realized by forming the flexure structure from a flexure and a flexible conductor in which the conductor is a laminate of conductive metal and plastic and has an easily controlled and relatively higher spring constant, while the flexure has a relatively lower spring constant.

10 Claims, 2 Drawing Sheets

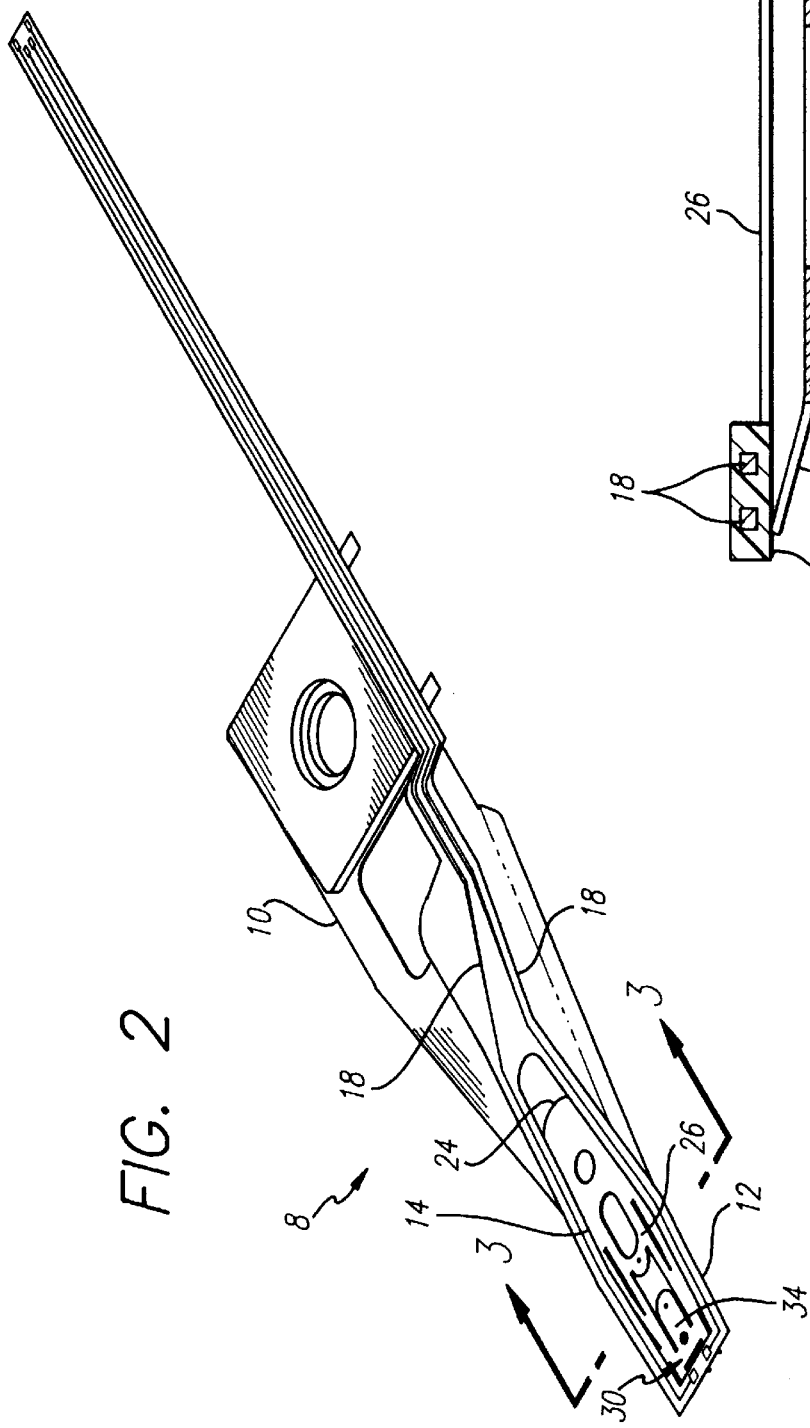
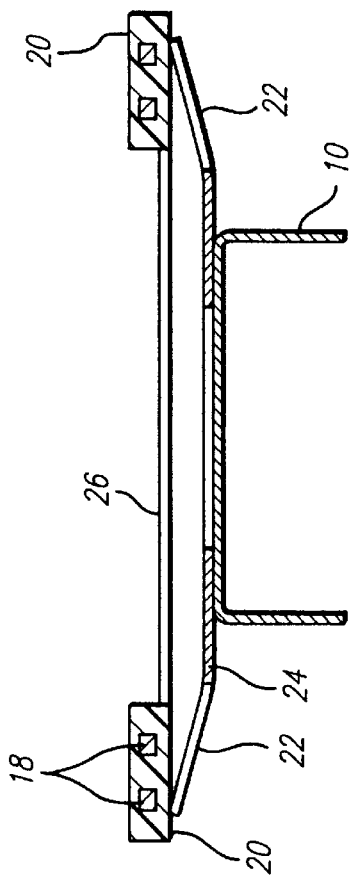
FIG. 2
FIG. 3

SUSPENSION FLEXURE WITH PRIMARY AND SECONDARY STIFFNESS CONTROL

REFERENCE TO RELATED APPLICATION

This application claims the benefit of U.S. Provisional Application No. 60/026,747, filed Sep. 26, 1996.

BACKGROUND OF THE INVENTION

This invention has to do with disk drive suspensions, more particularly with flexure and conductor assemblies for disk drive suspensions, and especially with the modification of flexure stiffness by fixing a flexible conductor having a separate stiffness thereto. Electrical connection and modification of the stiffness properties of the flexure are thus both obtained from a single arrangement of components.

The invention enables the use of very thin flexures having improved performance parameters. In a specific aspect, the invention provides disk drive suspensions and flexures therein in which the spring constant is the sum of the inherent spring constant in a very thin flexure and the greater spring constant of a conductor laminate secured to the flexure. In a further aspect, the invention provides for reduction in conductor induced biases and certain bimetallic bending effects observed in disk drive suspensions by routing of the conductor as a laminate circumjacently of the flexure and supporting it at multiple locations, while attaching the laminate at a selected flexure locus where the resulting bias is predictable and parallel to the flexure spring.

BRIEF SUMMARY OF THE INVENTION

Accordingly the objects of the invention include the realization in a disk drive suspension the foregoing benefits and advantages over previously known disk drive suspensions.

These and other objects of the invention to become apparent hereinafter are realized in a disk drive suspension comprising a load beam, and supported by the load beam a flexure structure comprising a flexure having a given stiffness and a flexible conductor of a separate given stiffness, the flexure structure having a stiffness which is the sum of the stiffnesses of the flexure and the flexible conductor, the flexure structure being adapted to support a slider and head in gimballing relation In this and like embodiments: the flexure has a thickness of from about 0.0008 to about 0.0011 inch and a spring constant of less than about 2 $\mu$n-m/deg.; the flexure and the flexible conductor are adhered to each other in stiffness combining relation; the flexible conductor comprises at least one conductive wire and a plastic film laminated to the wire; the flexure structure has a predetermined spring constant, the flexure having a spring constant lower than the flexure structure predetermined spring constant, the flexible conductor having a spring constant higher than the flexure structure predetermined spring constant and sufficient when added to the flexure spring constant that the flexure structure has the predetermined spring constant; the flexure comprises a frame having a locus, the frame supporting at the locus a tongue for gimballing attachment of the slider and head, the flexible conductor lying circumjacent the load beam and flexure frame and attached to the flexure frame at the locus; the flexure defines a plurality of laterally projecting tabs, the flexible conductor being supported on the tabs circumjacently of the flexure except at the locus, whereby the flexible conductor bias on the flexure is parallel with the flexure tongue; the flexure tabs are circumferentially distributed about the flexure in bimetallic bending effect reducing relation; the flexure has a thickness of about 0.0011 inch and a spring constant of less than about 2 $\mu$n-m/deg.; and the flexure and the flexible conductor are adhered to each other at the flexure frame locus in stiffness combining relation.

In a further embodiment of the disk drive suspension, the flexure structure has a predetermined spring constant, the flexure having a spring constant lower than the flexure structure predetermined spring constant, the flexible conductor having a spring constant higher than the flexure structure predetermined spring constant and sufficient when added to the flexure spring constant that the flexure structure has the predetermined spring constant.

In this and like embodiments: the flexure comprises a frame having a locus, the frame supporting at the locus a tongue for gimballing attachment of the slider and head, the flexible conductor lying circumjacent the load beam and flexure frame and attached to the flexure frame at the locus; the flexure defines a plurality of laterally projecting tabs, the flexible conductor being supported on the tabs circumjacently of the flexure, whereby flexible conductor bias on the flexure is parallel with the flexure tongue; the flexure defines a plurality of laterally projecting tabs, the tabs being circumferentially distributed about the flexure in bimetallic bending effect reducing relation; the flexure has a thickness of about 0.0008 to about 0.0011 inch; and the flexure comprises a frame having a locus and a tongue depending from the frame at the locus, the flexible conductor and frame being adhered to each other at the flexure frame locus in stiffness combining relation.

In a further embodiment, there is provided a disk drive flexure comprising a frame having a locus and a depending tongue at the locus for mounting a slider and head in gimballing relation, the flexure having a plurality of laterally projecting tabs for carrying a flexible conductor circumjacently about the flexure with the flexible conductor attached to the flexure frame at the locus.

In this and like embodiments, the disk drive flexure has a thickness of about 0.0008 to about 0.0011 inch; and the flexure has a spring constant of less than about 2 $\mu$n-m/deg.

In yet a further embodiment, there is provided a disk drive flexure for mounting a slider and head in gimballing relation, the flexure having a thickness of about 0.0008 to about 0.0011 inch.

In this and like embodiments, the disk drive flexure has spring constant of less than about 2 $\mu$n-m/deg.; the flexure has a plurality of laterally projecting tabs for carrying a flexible conductor circumjacently about the flexure; there is further included a flexible conductor attached to the flexure frame, the flexible conductor having a greater spring constant than the flexure, whereby the assembly of the flexure and the flexible conductor has a spring constant which is the sum of the spring constants of the flexure and the flexible conductor; the flexible conductor comprises a plastic film and copper conductor laminate, the plastic film having a thickness of about 0.0005 to about 0.0020 inch and the copper conductor having a thickness of about 0.0002 to about 0.0007 inch.

In a still further embodiment, the invention provides a disk drive suspension comprising a load beam, a flexure, a perimetrical locus surrounding the flexure, the flexure having a central portion including a head gimbal assembly for a slider carrying a head in movable relation to a disk, and connected to the head an electrically conductive flexible web disposed within the perimetrical locus and beyond the flexure center portion.

In its method aspects, the invention contemplates the method of supporting a conductor on a disk drive suspension, including maintaining the conductor within a plastic film laminate, securing the laminate to the outer end of a flexure carried by a load beam, and routing the laminate circumjacent the flexure from the load beam to the flexure outer end.

In this and like embodiments, the method further includes maintaining a series of tabs projecting laterally from the flexure, and carrying the laminate on the tab circumjacently of the flexure.

In a further aspect, the invention provides the method of modifying the stiffness of a disk drive suspension flexure, including selecting a flexure having a frame of a given stiffness, locally securing to the flexure frame a laminate of a conductor and plastic film of a separate given stiffness than the flexure given stiffness while maintaining the balance of the flexure frame free of securement to the flexure frame to add the stiffness of the laminate to the given stiffness of the flexure frame.

In a still further aspect, the invention provides a method of manufacturing a disk drive suspension, including mounting to a load beam a flexure with a flexure tongue arranged for carrying a slider and a head and depending from a locus on the flexure, mounting a flexible laminate of a conductor and a plastic film to the flexure at the flexure locus for connecting the conductor with the head, and routing the laminate circumjacently of the flexure to the load beam.

In another method embodiment, the invention provides a method of operating a disk drive suspension, including maintaining a flexure and slider carried head connected to a conductor within a plastic laminate fixed to a forward locus on the flexure, and supporting the laminate rearwardly of the locus circumjacent the flexure.

BRIEF DESCRIPTION OF THE DRAWINGS

The invention will be further described in conjunction with the attached drawings in which:

FIG. 2 is an assembled view thereof, and,

FIG. 3 is a view taken on line 3—3 in FIG. 2.

DETAILED DESCRIPTION OF THE INVENTION

Figure 1:
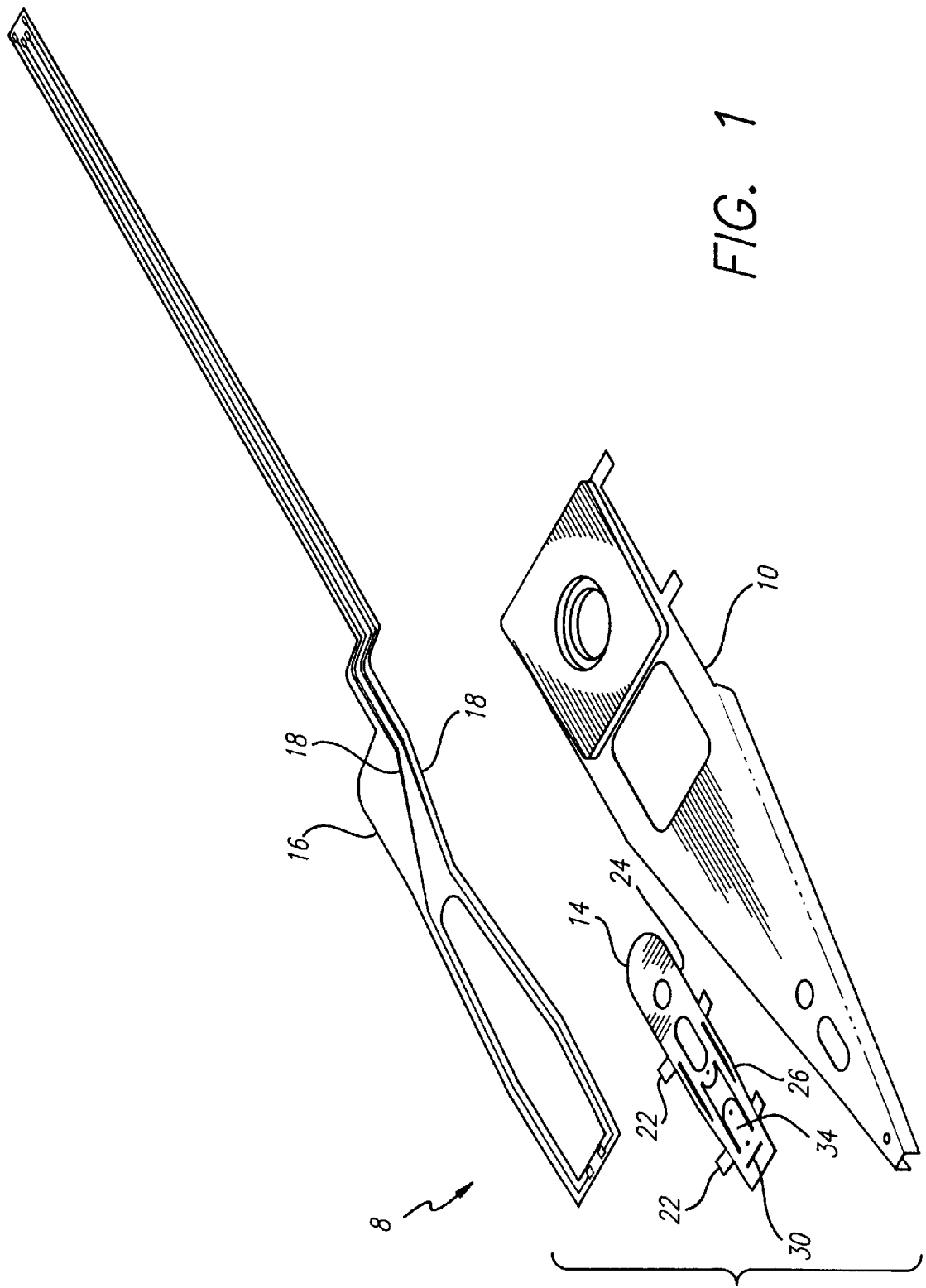
FIG. 1 is an exploded view of the invention disk drive suspension.

The invention provides a number of advantages especially in the design of nano and pico sized slider and suspensions systems. The invention enables the head gimbal assembly to have electrical connections to the magnetic heads without causing excessive bias to the slider air bearing. The bias from the flexible conductor is controlled and predictable. The invention enables bonding of the flexible conductor circumjacently of the flexure and load beam and avoidance of bonding of the conductor to the top of the flexure or load beam. The flexible conductor is guided around the flexure and attached to extensions of the flexures beyond the perimeter of the flexure body, and fixed with epoxy adhesive or laser welding. Accordingly, the invention advantages include:

1. The use of the flexible conductor eliminates the wire biases caused by use of 4 wires to the head.
2. The flexible conductor bias is predictable, can be designed for, and is parallel with the flexure spring.
3. Multiple attachment points of the flexible conductor to the load beam and flexure reduces bimetallic bending effects arising from temperature change in the disk drive.
4. Flexible conductors are low cost and reliable.
5. Multiple layers of conductors can be designed at lower cost than other solutions.
6. Flexure and suspension vibration gain is dampened by use of the flexible conductor in accordance with the invention.

With reference now to the drawings in detail, in FIGS. 1, 2 and 3 disk drive suspension 8 comprises a generally conventional load beam 10 and affixed thereto a flexure structure 12 according to the invention. The flexure structure 12 comprises the flexure 14 and the flexible conductor 16. The flexure 14 is formed of stiff material such as a stainless steel having a known stiffness. It is an advantage of this invention that the flexure 14 can be formed thinner than heretofore and thus have increased responsiveness, but without loss of adequate stiffness in view of the combination of the flexure with the flexible conductor 16.

Flexible conductor 16 comprises one or more conductors 18 laminated within opposed plastic film sheets 20 for transfer of signals from a head to be attached to the flexure 14 via a slider not shown. Flexible conductor 16 has a stiffness contributed by the stiffness of the conductors 18 therein, by the stiffness of the film sheets 20, and by their lamination together as shown. The flexible conductor 16 stiffness is a known value for a given laminate.

It is the availability of a known stiffness value flexible conductor 16 which enables the controlled modification of the flexure 14 to a desired stiffness value above that realized from the flexure alone owing to its lower than normal thinness.

The flexure structure 12 comprises the flexure 14 and the flexible conductor 16 attached to the flexure by welding or adhesive at the tabs 22 which extend from the periphery 24 of the flexure frame 26. The flexible conductor 16 is only attached to the flexure frame 26 at the locus 30 where its leads (not shown) are connected to the head (not shown).

The flexure frame 26 supports the tongue 34 at the locus 30 for gimbaling attachment of a slider and head arrangement (not shown). The flexure 14 is preferably relatively thinner than the usual flexure, having a thickness of about 0.0008 to 0.0011 inch. In a preferred mode, the flexure 14 has a spring constant of less than about 2 $\mu$n-m/deg. and higher than the spring constant of the flexure 14. The flexure frame 26 supports the flexible conductor 16 in circumjacent relation on the tabs 22, enabling the routing of the flexible conductor around rather than upon the flexure as described. The effect of the connection of the flexible conductor 16 at the locus 30 is a modification of the flexure 14 stiffness and its spring constant in the sense that the structure 12 which comprises the flexure and the flexible conductor has a stiffness and spring constant that is the additive result of the flexure and flexible conductor values, assuming the bond between them to be only a nominal factor. In general, it is desired to use a thinner, more flexible flexure 14, provided adequate stiffness can be maintained. The flexible conductor 16 provides the ability to obtain the degree of stiffness desired in a given thinness flexure 14.

For example, a flexure structure formed of a stainless steel flexure 14 of 0.0011 inch thickness having a spring constant $K_S$ to which is bonded a flexible conductor 16 comprised of Kapton-E of 0.0020 thickness laminated with a conductor of copper 0.0007 inch thickness having a spring constant of $K_{flex}$ will have a spring constant $K=K_S+K_{flex}$.

As an illustration, a typical flexure will have the stiffness values in Column A below, a typical flexible conductor the stiffness values in Column B, and the flexure structure from their combination, their combined stiffness values as shown in Column C.

| STIFFNESS VALUES | | | | |
|---|---|---|---|---|
| | A | + B | = | C |
| Pitch | 2.84 μ N.m/Deg | + 0.45 μ N.m/Deg | = | 3.29 μ N.m/Deg |
| Roll | 2.15 μ N.m/Deg | + 0.27 μ N.m/Deg | = | 2.42 μ N.m/Deg |
| Lateral | 10.41 N/mm | + 0.30 N/mm | = | 10.71 N/mm |

In the method aspects of the invention, the flexible conductor 16 is supported on the disk drive suspension 8 by including conductors 18 within a laminate of plastic sheets 20 to form flexible conductor 16, securing the flexible conductor to the locus 30 at the outer end of the flexure 14 carried by the load beam 10, and routing the laminated flexible conductor across the laterally projecting tabs 22 circumjacent the flexure from the load beam to the locus 30.

In a further method aspect, the stiffness of the suspension flexure 14 is modified by selecting a flexure 12 having a frame 26 of a given stiffness, locally securing, e.g. at locus 30, to the flexure a flexible conductor 16 of a separate given stiffness than the flexure, and maintaining the balance of the flexible conductor free of securement to the flexure frame to add the stiffness of the flexible conductor to the given stiffness of the flexure frame.

In a further method aspect, a method of manufacturing a disk drive suspension 8 is provided, including mounting to a load beam 10 a flexure 14 with a flexure tongue 34 arranged for carrying a slider and head, and depending from the flexure, mounting a laminate of a conductor 18 and plastic film 20 to the flexure at the flexure locus 30 for connecting the conductor to with the head, and routing the laminate circumjacently of the flexure, carried on laterally projecting tabs 22.

In the operation method of the invention, the flexure 14 adapted to carry a slider and head is maintained connected to a conductor 18 within a plastic sheet 20 laminate fixed to a forward locus 30 on the flexure, the laminate being supported rearwardly of the locus and circumjacent the flexure.

The invention thus provides for the use of very thin flexures having improved performance parameters, including a spring constant which is the sum of the inherent spring constant in a very thin flexure and the greater spring constant of a conductor laminate secured to the flexure, a reduction in conductor induced biases and bimetallic bending effects by routing of the conductor as a laminate circumjacently of the flexure and supporting it at multiple locations, while attaching the laminate at a selected flexure locus where the resulting bias is predictable and parallel to the flexure spring.

The foregoing objects of the invention are thus met.

What is claimed is:

1. A disk drive suspension comprising a load beam, and supported by the load beam a flexure structure comprising a flexure having a given stiffness, and a separate flexible conductor of a separate given stiffness, said flexure comprising a frame and a tongue supported by said frame, said flexible conductor being attached to said flexure frame at said tongue, whereby said flexure structure has a stiffness which is the sum of the stiffnesses of said flexure and said flexible conductor.

2. The disk drive suspension according to claim 1, in which said flexure has a thickness of from about 0.0008 to about 0.0011 inch and a spring constant of less than about 2 μn-m/deg.

3. The disk drive suspension according to claim 1, in which said flexure and said flexible conductor are attached by being adhered to each other in stiffness combining relation.

4. The disk drive suspension according to claim 1, in which said flexible conductor comprises at least one conductive wire and a plastic film laminated to said wire.

5. The disk drive suspension according to claim 4, in which said flexure structure has a predetermined spring constant, said flexure having a spring constant lower than said flexure structure predetermined spring constant, said flexible conductor having a spring constant higher than said flexure structure predetermined spring constant and sufficient when added to said flexure spring constant that said flexure structure has said predetermined spring constant.

6. The disk drive according to claim 5, in which said flexure frame supports said tongue at a locus, said flexible conductor lying circumjacent said load beam and flexure frame and attached to said flexure frame at said locus.

7. The disk drive according to claim 6, in which said flexure frame defines a plurality of circumferentially distributed, laterally projecting tabs, said flexible conductor being supported on said tabs circumjacently of said flexure frame except at said locus.

8. The disk drive suspension according to claim 5, in which said flexure has a thickness of about 0.0011 inch and a spring constant of less than about 2 μn-m/deg.

9. Disk drive suspension comprising a load beam and a flexure, said flexure comprising a frame having a perimetrical locus surrounding said flexure frame, said flexure frame having a central portion including a tongue and an electrically conductive flexible web disposed in said perimetrical locus, said web being attached to said flexure at said central portion.

10. The method of manufacturing a disk drive suspension, including mounting to a load beam a flexure with a flexure tongue arranged for carrying a slider and depending from a locus on said flexure, mounting a separate flexible laminate of a conductor and a plastic film to said flexure at said flexure locus for connecting said conductor with said head, and routing said laminate circumjacently of said flexure to said load beam.

* * * * *